United States Patent
Niewiedzial

[19]

[11] Patent Number: 5,565,020
[45] Date of Patent: Oct. 15, 1996

[54] PROCESS AND ARRANGEMENT FOR SEPARATING PARTICULATE SOLIDS

[75] Inventor: Steven Niewiedzial, Hoffman Estates, Ill.

[73] Assignee: UOP, Des Plaines, Ill.

[21] Appl. No.: 345,056

[22] Filed: Nov. 25, 1994

[51] Int. Cl.$^6$ ................................................ B01D 45/00
[52] U.S. Cl. ........................... 95/271; 55/345; 55/459.1; 208/161; 422/147
[58] Field of Search ........................... 55/343, 345, 346, 55/349, 448, 449, 459.1; 422/147; 95/271; 208/161

[56] References Cited

U.S. PATENT DOCUMENTS

| | | | |
|---|---|---|---|
| 2,535,140 | 12/1950 | Kassel | 183/83 |
| 4,289,514 | 9/1981 | Carter et al. | 55/448 |
| 4,397,738 | 8/1983 | Kemp | 208/161 |
| 4,482,451 | 11/1984 | Kemp | 208/161 |
| 4,588,558 | 5/1986 | Kam et al. | 422/147 |
| 4,624,772 | 11/1986 | Krambeck et al. | 422/147 |
| 4,670,410 | 6/1987 | Baillie | 502/41 |
| 4,701,307 | 2/1987 | Walters et al. | 422/147 |
| 4,737,346 | 4/1988 | Haddad et al. | 422/147 |
| 4,778,660 | 10/1988 | Haddad et al. | 422/147 |
| 4,792,437 | 12/1988 | Hettinger, Jr. et al. | 422/147 |
| 4,853,187 | 8/1989 | Herbst et al. | 422/147 |
| 4,909,993 | 3/1990 | Haddad et al. | 422/147 |
| 5,104,519 | 4/1992 | Haddad et al. | 422/147 |
| 5,190,650 | 3/1993 | Tammera et al. | 422/147 |
| 5,279,727 | 1/1994 | Helstrom et al. | 422/147 |
| 5,362,379 | 11/1994 | Helstrom et al. | 422/147 |

*Primary Examiner*—C. Scott Bushey
*Attorney, Agent, or Firm*—Thomas K. McBride; John G. Tolomei

[57] ABSTRACT

In this invention a cyclonic separation method and apparatus discharges particulate solids and gaseous fluids into a separation vessel from a discharge opening of a central conduit and withdraws separated gaseous fluids from the separation vessel with a recovery conduit having an inlet located below the discharge opening. Recovery of separated gases using cyclonic separation is improved by the specific location of the recovery piping inlet which reduces the entrainment of fine particles with the gases.

19 Claims, 2 Drawing Sheets

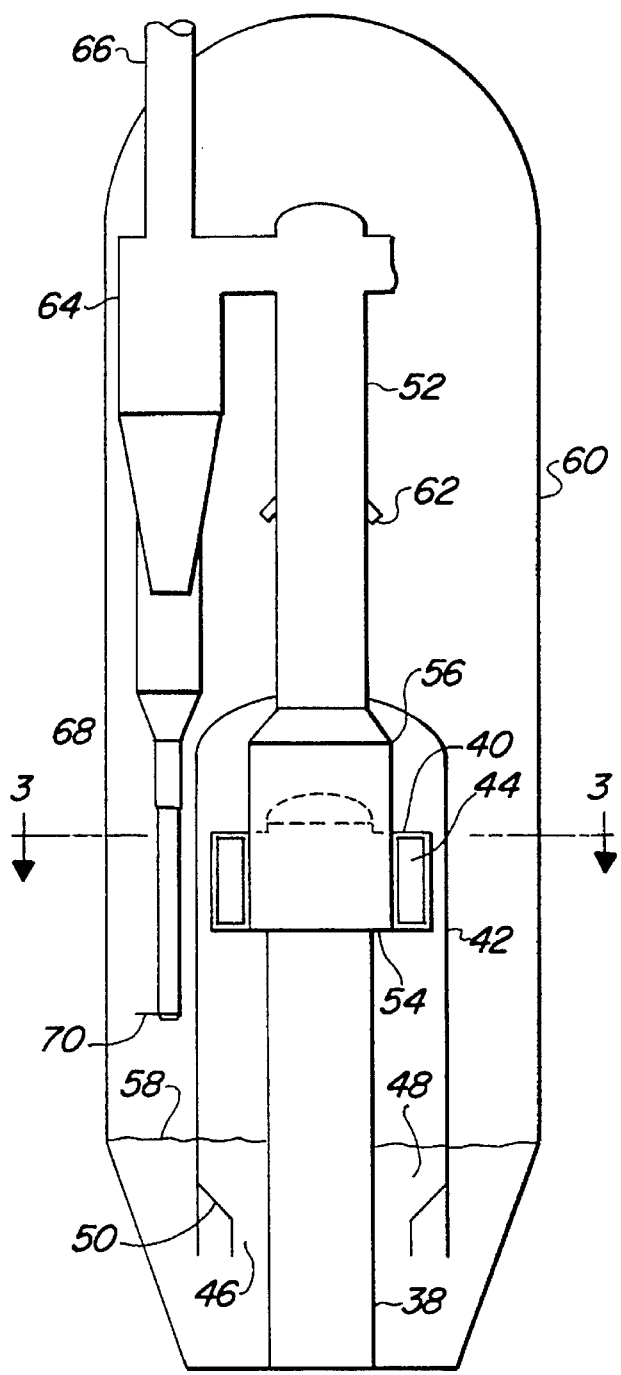
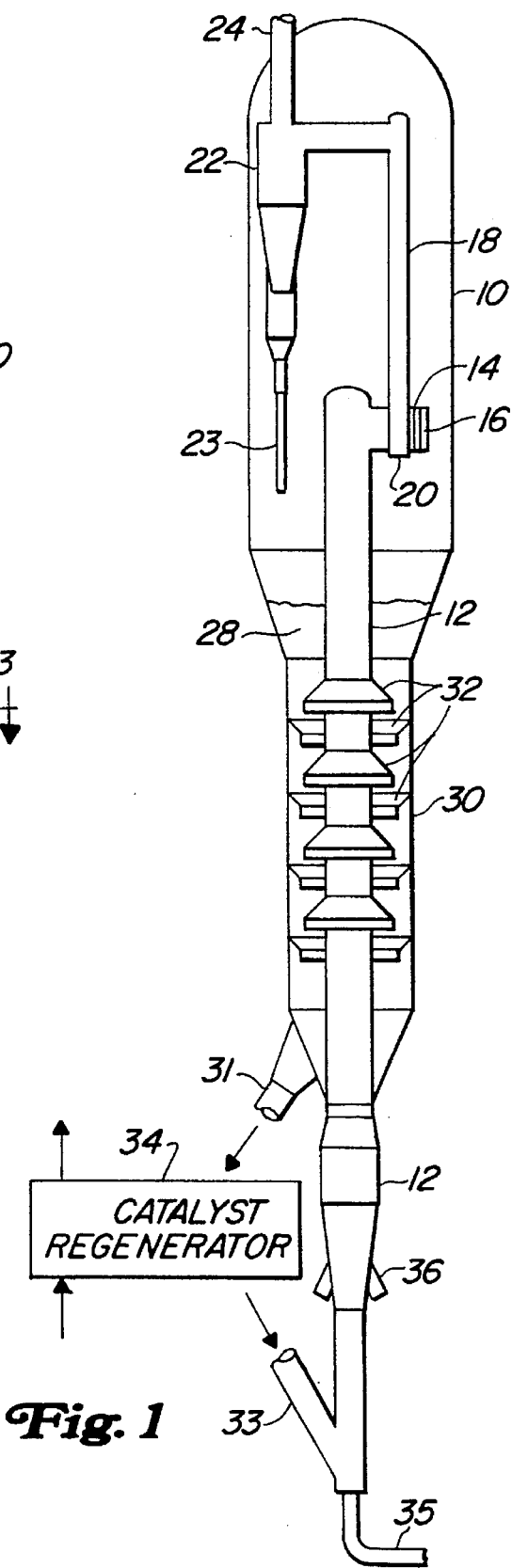
Fig. 2
Fig. 1

PROCESS AND ARRANGEMENT FOR SEPARATING PARTICULATE SOLIDS

BACKGROUND OF THE INVENTION

1. Field of the Invention

This invention relates generally to processes for the separation of particulate solids from gases. More specifically, this invention relates to the separation of catalyst and gaseous materials from a mixture thereof in a cyclonic disengaging vessel.

1. Description of the Prior Art

Cyclonic methods for the separation of solids from gases are well known and commonly used. A particularly well known application of such methods is in the hydrocarbon processing industry were particulate catalysts contact gaseous reactants to effect chemical conversion of the gas stream components or physical changes in the particles undergoing contact with the gas stream.

The FCC process presents a familiar example of a process that uses gas stream to contact a finally divided stream of catalyst particles and effects contact between the gas and the particles. The FCC processes, as well as separation devices used therein are fully described in U.S. Pat. Nos. 4,701,307 and 4,792,437, the contents of which are hereby incorporated by reference.

The most common method of separating particulate solids from a gas stream uses a cyclonic separation. Cyclonic separators are well known and operate by imparting a tangential velocity to a gases containing entrained solid particles that forces the heavier solids particles outwardly away from the lighter gases for upward withdrawal of gases and downward collection of solids. Cyclonic separators usually comprise relatively small diameter cyclones having a tangential inlet on the outside of a cylindrical vessel that forms the outer housing of the cyclone.

Cyclones for separating particulate material from gaseous materials are well known to those skilled in the art of FCC processing. In the operation of an FCC cyclone tangential entry of the gaseous materials and catalyst creates a spiral flow path that establishes a vortex configuration in the cyclone so that the centripetal acceleration associated with an outer vortex causes catalyst particles to migrate towards the outside of the barrel while the gaseous materials enter an inner vortex for eventual discharge through an upper outlet. The heavier catalyst particles accumulate on the side wall of the cyclone barrel and eventually drop to the bottom of the cyclone and out via an outlet and a dip leg conduit for recycle through the FCC arrangement. Cyclone arrangements and modifications thereto are generally disclosed in U.S. Pat. Nos. 4,670,410 and 2,535,140.

The FCC process is representative of many processes for which methods are sought to quickly separate gaseous fluids and solids as they are discharged from a conduit. In the FCC process one method of obtaining this initial quick discharge is to directly connect a conduit containing a reactant fluid and catalyst directly to a traditional cyclone separators. While improving separation, there are drawbacks to directly connecting a conduit discharging a mixture of solids and gaseous fluids into cyclone separators. Where the mixture discharged into the cyclones contains a high loading of solids, direct discharge requires large cyclones. In addition, instability in the delivery of the mixture may also cause the cyclones to function poorly and to disrupt the process where pressure pulses cause an unacceptable carryover of solids with the vapor separated by the cyclones. Such problems are frequently encountered in processes such as fluidized catalytic cracking. Accordingly, less confined systems are often sought to effect an initial separation between a mixture of solid particles and gaseous fluids.

U.S. Pat. Nos. 4,397,738 and 4,482,451, the contents of which are hereby incorporated by reference, disclose an alternate arrangement for cyclonic separation that tangentially discharges a mixture of gases and solid particles from a central conduit into a containment vessel. The containment vessel has a relatively large diameter and generally provides a first separation of solids from gases. This type of arrangement differs from ordinary cyclone arrangements by the discharge of solids from the central conduit and the use of a relatively large diameter vessel as the containment vessel. In these arrangements the initial stage of separation is typically followed by a second more complete separation of solids from gases in a traditional cyclone vessel.

BRIEF SUMMARY OF THE INVENTION

It has now been discovered that the efficiency of a cyclonic separation that centrally discharges particles into a separation chamber may be surprisingly improved by changing the point from which the gaseous stream is collected. In accordance with this discovery collecting the gaseous fluids recovered by separation of the fluid and solids from an outlet located below the inlet of a central conduit that discharges the gaseous fluids and solids will increase the efficiency of separating the gaseous fluids from the solids. This improvement in the separation is particularly helpful in processes where a quick separation between the gaseous fluids and the solid particles are desired. The improvement in the separation is achieved with only minimal addition to the structure of the separation system. Through the addition of a small amount of conduit the separation efficiency achieved by an open disengaging vessel will provide very low catalyst loadings and in some cases will approach catalyst loadings obtained by traditional cyclone designs.

Accordingly, in one embodiment this invention is an apparatus for separating solids from a stream comprising a mixture of gaseous fluids and solid particles. The apparatus includes a separation vessel and a mixture conduit that extends into the separation vessel and defines a discharge opening located within the vessel. The discharge opening discharges the stream of gaseous fluids and solid particles into the vessel and imparts a tangential velocity to the stream. The separation vessel defines an outlet for discharging particles from a lower portion of the vessel. In accordance with this invention a gas recovery conduit defines an inlet for withdrawing gaseous fluids from separation vessel at a location below the discharge opening.

In another embodiment this invention is an apparatus for separating solid particles from a stream comprising a mixture of gaseous fluids and solid particles. The apparatus includes a containment vessel, a separation vessel located within the containment vessel that has an open bottom and a central conduit extending vertically into the separation vessel. The separation vessel houses at least two curved conduits that communicate with and extend radially from the central conduit. Each arm defines a discharge opening for the tangential discharge of the stream into the separation vessel. A gas recovery conduit defines an inlet below and radially inward from the discharge conduit for collecting gaseous fluids from the separation vessel.

In another embodiment this invention is a method for separating solid particles from a stream comprising a mixture of solid particles and gaseous fluids. The method passes the mixture of solid particles and gaseous fluids into a separation vessel through a central conduit and tangentially discharges the mixture from a discharge opening into the separation vessel. The method collects gaseous fluids from the separation vessel at a location below a discharge opening and withdraws gaseous fluids from the separation vessel. Solid particles pass out of the separation vessel at a location below the discharge opening and the inlet.

Additional details and embodiments of the invention will become apparent from the following detailed description of the invention.

BRIEF DESCRIPTION OF THE DRAWINGS

FIG. 1 is a sectional elevation of an FCC reactor vessel schematically showing a separation vessel arranged in accordance with this invention.

FIG. 2 shows a modification to the upper section of the FCC reactor vessel of FIG. 1.

DETAILED DESCRIPTION OF THE INVENTION

Figure 3:
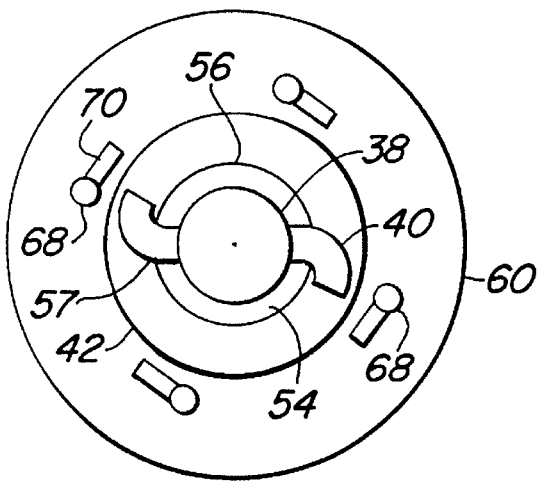
FIG. 3 is a section view taken across line 3—3 of FIG. 2 showing a plan view of a separation arrangement of this invention.

The apparatus of this invention comprises a separation vessel into which a mixture conduit that contains the mixture of solid particles transported by a gaseous fluid discharges the particles and gaseous fluid mixture. The separation vessel is preferably a cylindrical vessel. The cylindrical vessel promotes the swirling action of the gaseous fluids and solids as they are discharged tangentially from a discharge opening of the mixture conduit into the separation vessel. The separation vessel will preferably have an open interior below the discharge opening that will still provide satisfactory operation in the presence of some obstructions such as conduits or other equipment which may pass through the separation vessel.

The discharge opening and the conduit portion upstream of the discharge opening are constructed to provide a tangential velocity to the exiting mixture of gaseous fluids and solids. The discharge opening may be defined using vanes or baffles that will impart the necessary tangential velocity to the exiting gaseous fluids and solids. Preferably the discharge outlet is constructed with conduits or arms that extend outwardly from a central mixture conduit. Providing a section of curved arm upstream of the discharge conduit will provide the necessary momentum to the gaseous fluids and solids as they exit the discharge opening to continue in a tangential direction through the separation vessel. The separation vessel has an arrangement that withdraws catalyst particles from the bottom of the vessel so that the heavier solid particles disengage downwardly from the lighter gaseous fluids. The bottom of the separator vessel may be completely open to permit solid particles to fall freely from the separation vessel or a bed of solid particles may be maintained at the bottom of the separation vessel.

An essential feature of this invention is the location of the outlet from the separation vessel for withdrawing the gaseous fluids from the separation vessel. The outlet of the separation vessel for the gaseous fluid is provided the inlet of a withdrawal conduit that extends into the separation vessel. The inlet to the withdrawal conduit is located below the discharge openings of the central conduit. The withdrawal conduit can have any configuration provided it defines the inlet at the required location below the discharge openings. The discharge opening is preferably spaced outwardly with respect to the inlet to the gas recovery conduit. Arrangements that use curved conduits to impart the tangential velocity are particularly preferred again since the discharge openings are readily located in an outer portion of the separation vessel relative to the inlet for the gas recovery conduit.

The apparatus and method of separating solid particles from a mixture of gaseous and solid particles as disclosed by this invention is useful in any process that seeks a good initial separation of solid particles from gaseous fluids in a separation system that is more open than traditional cyclones. Those skilled in the art are aware of a variety of processes that utilize fluidized particles and require the separation of particulate material from the gaseous fluids used for transport of the particles. The remainder of this invention is described in the context of a specific application of this invention to an FCC reactor arrangement. Those skilled in the art of particle separation and transport will readily appreciate the application of this invention to other processes where separation of particles from gaseous fluids is desired.

DESCRIPTION OF THE PREFERRED EMBODIMENTS

Looking then at FIG. 1, the schematic illustration depicts a separation arrangement in a reactor vessel 10. A central conduit in the form of a reactor riser 12 extends upwardly from a lower portion of the vessel 10 in a typical FCC arrangement. The central conduit or riser preferably has a vertical orientation within the separation vessel and may extend upwardly from the bottom of the separation vessel or downwardly from the top of the separation vessel. Riser 12 terminates in an upper portion of reactor vessel 10 with an curved conduit in the form of an arm 14. Arm 14 discharges a mixture of gases fluids and solid particles comprising catalyst. In a reactor arrangement as depicted by FIG. 1 the gaseous fluid comprises product vapors.

Tangential discharge of gases and catalyst from a discharge opening 16 produces a swirling helical pattern about the interior of reactor vessel 10 below the discharge opening 16. Centripetal acceleration associated with the helical motion forces the heavier catalyst particles to the outer portions of reactor vessel 10. The gases, having a lower density than the solids, more easily change direction and begin an upward spiral with the gases ultimately traveling into a gas recovery conduit 18 having an inlet 20. Inlet 20 is located below the discharge opening 16. The gases that enter gas recovery conduit 18 through inlet 20 will usually contain a light loading of catalyst particles. Inlet 20 recovers gases from the discharge conduit as well as stripping vapors which are hereinafter described. The loading of catalyst particles in the gases entering conduit 18 are usually less than 1 lb/ft.$^3$ and typically less than .1 lb/ft$^3$.

Gas recovery conduit 18 passes the separated gases into a cyclone 22 that effects a further removal of particulate material from the gases in the gas recovery conduit. Cyclone 22 operates as a conventional cyclone in a conventional manner with the tangential entry of the gases creating a swirling action inside the cyclones to establish the well known inner and outer vortexes that separate catalyst from gases. A gaseous stream relatively free of catalyst particles exits the reactor vessel 10 through an outlet 24.

Catalyst recovered by cyclone 22 exits the bottom of the cyclone through a dip-leg conduit 23 and passes through a lower portion of the reactor vessel 10 where it collects with catalyst from the discharge opening 16 in a catalyst bed 28. Catalyst from catalyst bed 28 passes downwardly through a stripping vessel 30 where countercurrent contact with a stripping fluid through a series of stripping baffles 32 displaces product gases from the catalyst as it continues downwardly through the stripping vessel.

Stripped catalyst from stripping vessel 30 passes through a conduit 31 to a catalyst regenerator 34 that rejuvenates the catalyst by contact with an oxygen-containing gas. High temperature contact of the oxygen-containing gas with the catalyst oxidizes coke deposits from the surface of the catalyst. Following regeneration catalyst particles enter the bottom of reactor riser 12 through a conduit 33 where a fluidizing gas from a conduit 35 pneumatically conveys the catalyst particles upwardly through the riser. As the mixture of catalyst and conveying gas continues up the riser, nozzles 36 inject feed into the catalyst, the contact of which vaporizes the feed to provide additional gases that exit through discharge opening 16 in the manner previously described.

In the arrangement depicted in FIG. 1, reactor vessel 10 serves as both a separation vessel and a containment vessel for the process overall. FIG. 2 depicts a modified arrangement wherein a separate containment vessel and separation vessel are provided. Looking then at FIG. 2 a central conduit in the form of a reactor riser 38 delivers a mixture of catalyst particles and gases to a pair of arms 40 that tangentially discharge the mixture of catalyst particles and gases into a separation vessel 42 through discharge openings 44. The tangential delivery of the mixture of catalyst particles and gases effects separation in the manner previously described with the catalyst particles passing downwardly through the separation vessel 42 and out of a lower portion of the separation vessel, through an outlet 46. Prior to passing through outlet 46, catalyst collects in a bed 48 contained within the separation vessel 42. An initial displacement of gases comprising product hydrocarbons may be effected in bed 48 by contact with a stripping fluid. In the arrangement of FIG. 2, stripping fluid is delivered to the underside of a baffle 50 and passes through a series of holes in baffle 50 (not shown).

Gas recovery conduit 52 withdraws gases comprising product hydrocarbons and stripping medium from the separation vessel at a location below discharge opening 44 through an annular inlet 54 defined by an enlarged conduit 56 that shrouds the end portion of riser 38 to a location below discharge openings 44. Holes provided in the sides of shroud 56 provide slots through which arms 40 pass. The structure of shroud 56 and arms 40 again provide the preferred structure wherein the gases and catalyst are discharged at a radial distance from the center of riser 38 that is greater than the distance from inlet opening 54 such that the gases containing a lower concentration of catalyst are removed closer to the center of the separation vessel 42 and riser 38. Additional stripping takes place below separation vessel 42 and stripping fluid passes upwardly across a bed surface 58.

A reactor vessel 60 serves as a containment vessel that houses the separation vessel 42 and also confines gases passing across bed surface :58. Gases in the upper volume of reactor vessel 60 enter the gas recovery conduit 52 through a series of ports 62. The combined stream of separated gases from inlet 54 and additional stripping fluid and gases from port 62 pass upwardly through recovery conduit 52 and into a traditional cyclone separator 64 that again effects a further separation of the remaining catalyst that is still entrained with the gases. Gases exit the top of cyclone 64 through an outlet 66 while recovered catalyst particles pass downwardly through a dip-leg conduit 68 at a rate regulated by a flapper valve 70. Catalyst from dip-leg conduit 68 as well as bed 48 pass out of the reactor vessel for stripping in the manner previously described.

The separation vessel and recovery conduit arrangement of FIG. 2 uses shroud 56 to provide an annular opening 54 that is more fully depicted in FIG. 3. As shown in FIG. 3 shroud 56 surrounds riser 38 to provide the annular opening 54. FIG. 3 shows the previously described slots at reference number 57 through which arms 40 extend out through the sides of shroud 56. The slotted arrangement allows for differential expansion of riser 38 relative to the shroud and separation vessel. A slotted arrangement is preferred so that shroud 56 and the associated recovery piping may be supported from cyclones 64. In addition, separator vessel 42 may also be supported from recovery piping 52. FIG. 3 also shows the location of multiple dip pipes and flapper valves that correspond to the usual practice of providing two or more cyclones in a symmetrical relationship and communication with the gas recovery conduit.

Figure 4:
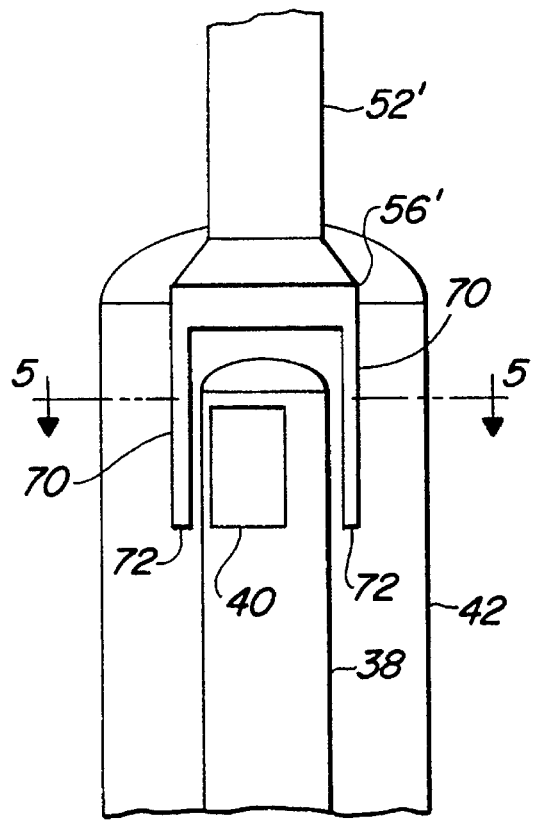
FIG. 4 shows a modified form of the separation arrangement depicted in FIG. 2.

The use of an annular opening for the recovery of gaseous fluids from below the discharge openings is susceptible to other arrangements. One such arrangement is depicted in FIG. 4 which illustrates a modification to the arrangement of FIGS. 2 and 3. FIG. 4 shows the upper end of separation vessel 42 from FIG. 2 and a lower portion 52' of the gas recovery conduit. Riser 38 is essentially the same as that disclosed in FIGS. 2 and 3 and extends upwardly to near the top of the separation vessel 42. The inlet to the recovery conduit 52' shows a modified shroud 56' that defines partial annular conduits 70. Conduits 70 extend downwardly past the arm 40 to define inlets 72 that are located below the arm 40 to withdraw gases from below the discharge opening.

Figure 5:
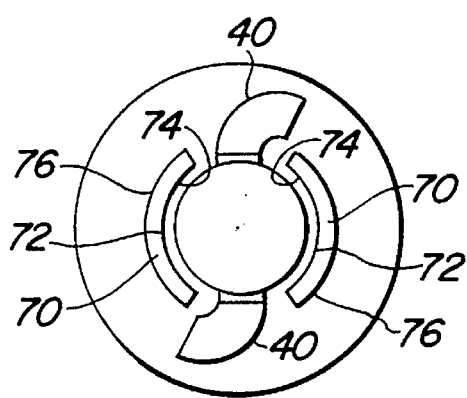
FIG. 5 is a section taken across line 5—5 of FIG. 4 showing the modified form of the separation arrangement of FIG. 4 in plan view.

The geometry of conduits 70 are shown more clearly in the cross-section provided by FIG. 5. The conduits 70 have inner walls 74 and outer walls 76 that are closed at the vertical ends to define partial annular openings 72. This arrangement has the advantage of eliminating the slots that were needed in the sides of shroud 56 as depicted in FIGS. 2 and 3 to accommodate arms 40. The conduits 70 provided by this arrangement are completely closed to prevent the small bypassing of fluids that can occur through the slot 57 in shroud 56. In this arrangement the shroud 56 is completely closed to prevent any ingress of fluids into the recovery conduit above the discharge opening.

What is claimed is:

1. An apparatus for separating solid particles from a stream comprising a mixture of gaseous fluids and solid particles, said apparatus comprising:

a separation vessel;

a mixture conduit extending vertically into a central section of said separation vessel and defining a discharge opening located within said vessel and tangentially oriented for discharging said stream into the open interior of said vessel and imparting a tangential velocity to said stream;

a particle outlet defined by said separation vessel for discharging particles from a lower portion of said vessel; and, a gas recovery conduit defining an inlet for withdrawing gaseous fluids from within the open interior of said separation vessel at a location below said discharge opening and radially offset from the mixture conduit.

2. The apparatus of claim 1 wherein said separation vessel is a containment vessel having an open interior and said gas recovery conduit communicates with a cyclone separator located in said vessel.

3. The apparatus of claim 1 wherein said mixture conduit is a vertical riser conduit that extends upwardly into a central portion of said vessel.

4. The apparatus of claim 1 wherein said separation vessel is located within a containment vessel.

5. The apparatus of claim 1 wherein said separation vessel is cylindrical and said discharge opening is spaced radially farther from the central axis of said separation vessel than said inlet.

6. The apparatus of claim 5 wherein said inlet comprises an opening in the form of an annular segment.

7. The apparatus of claim 5 wherein said inlet comprises an opening in the form of an annulus.

8. An apparatus for separating solid particles from a stream comprising a mixture of gaseous fluids and solid particles, said apparatus comprising:

a containment vessel;

a separation vessel located within said containment vessel having an open bottom;

a central conduit extending vertically into said separation vessel;

at least two curved conduits located in said separation vessel, said curved conduits communicating with and extending radially from said central conduit, each curved conduit defining a discharge opening for the tangential discharge of said stream into the open interior of said separation vessel; and a gas recovery conduit defining an inlet located below and radially inward from said discharge opening for collecting gaseous fluids from within the open interior of said separation vessel, said inlet being radially offset from said central conduit.

9. The apparatus of claim 8 wherein said central conduit is a vertical riser conduit that extends upwardly into a central portion of said vessel.

10. The apparatus of claim 8 wherein said inlet comprises an opening in the form of an annular segment.

11. The apparatus of claim 8 wherein said inlet comprises an opening in the form of an annulus.

12. A method for separating solid particles from a stream comprising a mixture of solid particles and gaseous fluids, said method comprising:

passing said mixture of solid particles and gaseous fluids into a separation vessel through a central conduit;

tangentially discharging said mixture from a discharge opening into the open interior of said separation vessel;

collecting gaseous fluids from said separation vessel into an inlet below said discharge opening and radially offset from the central conduit and withdrawing gaseous fluids from the open interior of said separation vessel; and passing solid particles from said separation vessel at a location below said discharge opening and said inlet.

13. The method of claim 12 wherein said stream is discharged at a location farther from the center of said separation vessel than the location from which the gaseous fluids are withdrawn.

14. The method of claim 12 further comprising passing said gaseous fluids from said inlet to a cyclone separator.

15. The method of claim 12 wherein said stream is discharged from at least two discharge openings.

16. The method of claim 12 wherein said solid particles comprise catalyst particles and said central conduit comprises a riser in a fluidized catalytic cracking process.

17. The method of claim 16 wherein said riser is a reactor riser.

18. An apparatus for separating solid particles from a stream comprising a mixture of gaseous fluids and solid particles, said apparatus comprising:

a separation vessel;

a mixture conduit extending into said separation vessel and defining a discharge opening located within said vessel and tangentially oriented for discharging said stream into said vessel and imparting a tangential velocity to said stream;

a particle outlet defined by said separation vessel for discharging particles from a lower portion of said vessel; and, a gas recovery conduit defining an inlet in the form of at least a segment of an annulus for withdrawing gaseous fluids within said separation vessel at a location below said discharge opening.

19. The apparatus of claim 18 wherein said inlet comprises and opening in the form of an annulus.

\* \* \* \* \*